US005596501A

United States Patent [19]
Comer et al.

[11] Patent Number: 5,596,501
[45] Date of Patent: Jan. 21, 1997

[54] SYSTEM FOR DISPENSING FUEL AT REMOTE LOCATIONS, AND METHOD OF OPERATING SAME

[75] Inventors: Timothy J. Comer; Tommy J. Embley, both of Anchorage; Eugene Mastej, Eagle River; Dorothy S. D. Wilson, Anchorage, all of Ak.

[73] Assignee: Powerplant Fuel Modules, LLC, Anchorage, Ak.

[21] Appl. No.: 504,250

[22] Filed: Jul. 19, 1995

[51] Int. Cl.$^6$ .............................. G07G 01/14; G06F 17/60
[52] U.S. Cl. ............... 364/464.23; 235/381; 340/825.35; 364/138; 902/22; 395/217
[58] Field of Search ....................... 235/381; 340/825.35; 364/138, 400, 401 R, 404, 405, 465; 902/22

[56] References Cited

U.S. PATENT DOCUMENTS

| | | | |
|---|---|---|---|
| 3,257,031 | 6/1966 | Dietz | 222/23 |
| 3,786,421 | 1/1974 | Wostl et al. | 235/381 |
| 3,788,755 | 1/1974 | Davis | 404/1 |
| 3,931,497 | 1/1976 | Gentile et al. | 235/381 |
| 4,186,381 | 1/1980 | Fleischer et al. | 340/152 R |
| 4,199,100 | 4/1980 | Wostl et al. | 235/381 |
| 4,395,626 | 7/1983 | Barket et al. | 235/381 |
| 4,395,627 | 7/1983 | Barker et al. | 235/381 |
| 4,749,992 | 6/1988 | Fitzemeyer et al. | 340/870.02 |
| 4,901,748 | 2/1990 | Shotmeyer | 137/234.6 |
| 4,977,528 | 12/1990 | Norris | 364/571.04 |
| 5,297,423 | 3/1994 | Keating et al. | 73/49.2 |

FOREIGN PATENT DOCUMENTS

05007690A1 3/1992 France.

Primary Examiner—Edward R. Cosimano
Attorney, Agent, or Firm—Bell, Seltzer, Park & Gibson

[57] ABSTRACT

A system for dispensing fuel at remote locations includes an operations control center and a plurality of remotely located fuel dispensing modules in wireless communication therewith using a telemetry-based communications system. The modules can operate independently of each other and 24-hours a day without the necessity of an on-site attendant and preferably without connection to commercial power and telephone lines. The modules can also operate for weeks or months at a time without being refueled and in remote locations which are subject to severe adverse weather conditions. The operations control center processes information relating to the dispensing of fuel and authorizes the dispensing of fuel at the modules upon receipt of payment information therefrom by generating and transmitting approval information to the modules. A fuel module preferably includes a transportable and multi-compartment housing, an above-ground multi-section fuel tank in the housing and a dispenser for dispensing fuel from the fuel tank upon receipt of payment information from a customer. Motion detectors are also provided to generate a motion-detect signal upon detection of motion external to the module housing, which can indicate the arrival of a customer. A diesel generator and bank of rechargeable batteries are also provided for supplying electrical energy to the dispenser in response to the motion-detect signal. The generator enables each module to function without being connected to commercial power lines from a utility.

35 Claims, 3 Drawing Sheets

SYSTEM FOR DISPENSING FUEL AT REMOTE LOCATIONS, AND METHOD OF OPERATING SAME

FIELD OF THE INVENTION

This invention relates to fuel distribution systems and methods, and more particularly to systems and methods for dispensing fuel to self-service customers.

BACKGROUND OF THE INVENTION

Filling stations of the type including combinations of both full and self-service fuel dispensing pumps and underground storage tanks represent the most common and universally accepted systems for storing and dispensing fuel to customers. Unfortunately, such conventional filling stations pose a substantial risk to the environment when fuel leaks occur and also require expensive procedures to remedy fuel leaks, including removal and replacement of the underground storage tanks. These stations also typically require operation by at least two filling station attendants, with one attending to full service customers and the other to monitor the delivery and billing of fuel to self-service customers. Recent attempts to improve on these systems are disclosed in U.S. Pat. Nos. 4,186,381 and 4,901,748 to Fleischer et al. and Shotmeyer, respectively.

In particular, the '381 patent to Fleischer et al. discloses a gasoline station registration and control system. This system includes a fixed remote control unit operable for selectively activating a self-service pump and registering the amount of fuel delivered. A portable control unit for operating the fixed control unit and registering the amount of fuel delivered via two-way radio communication between the portable and fixed control units. This system facilitates attendant operation of one or more full-service fuel pumps while the attendant simultaneously controls the deliveries of fuel from a plurality of self-service fuel pumps and charges each self-service customer for the fuel delivered. Accordingly, the '381 patent discloses a system which provides a filling station attendant with control over a greater number of fuel-pumps. The '748 patent to Shotmeyer also disclose a filling station having an above-ground fuel storage tank for use in a type of filling station which utilizes a canopy over the refueling areas. This filling station eliminates the use of underground storage tanks, which can be environmentally deleterious when leaks occur and remain unnoticed for extended periods of time.

European Patent Publication No. 507690 A1 also discloses a prefabricated filling station having an above-ground fuel storage tank. This station is transportable and can be used to meet temporary increases in fuel demand caused by short-term events which attract large crowds of people and a concomitant large concentration of automobiles requiring fuel. This station can also be used as a permanent fixture when environmental conditions are such as to make the installation of conventional filling stations impractical, such as when the land is overburdened or scarce and expensive. Water, electricity and telephone connections are provided with this station to meet the conditions set by the suppliers of these utilities. A desk with console and computer are also provided to facilitate the monitoring of pump operation by an attendant. However, this station cannot be used without the presence of an on-site attendant or without hook-up connections to commercial utilities including power, telephone and water. Accordingly, use of this station at remote locations is logistically and economically infeasible.

Notwithstanding these systems for dispensing fuel which improve the environmental reliability of filling stations and efficiency of operation thereof by attendants, there still exists a need for a cost effective and environmentally safe method of dispensing fuel in remote locations, where the feasibility of attendant operation and monitoring or hook-up to utility suppliers is practically impossible.

SUMMARY OF THE INVENTION

It is therefore an object of the present invention to provide a system and method for dispensing fuel at remote locations.

It is another object of the present invention to provide a system and method for dispensing fuel in a safe, cost effective and environmentally responsible manner.

It is still a further object of the present invention to provide a system and method for dispensing fuel which can be easily installed at remote locations and is readily transportable to other remote locations.

These and other objects, features and advantages are provided, according to the present invention, by a safe and environmentally responsible system for dispensing fuel at a plurality of remote locations. The system includes an operations control center and a plurality of fuel dispensing modules in wireless communication therewith. The modules can operate independently of each other and 24-hours a day without the necessity of an on-site attendant and preferably without connection to commercial power and telephone lines. The modules can also operate for weeks or months at a time without being refueled and in remote locations which are subject to severe adverse weather conditions.

In particular, the system includes an operations control center for processing information relating to dispensing of fuel from a plurality of remotely located fuel dispensing modules and authorizing the dispensing of fuel at the modules upon receipt of payment information therefrom by generating and transmitting approval information to the modules. The fuel modules preferably include a transportable, multi-compartment housing, an above-ground multi-section fuel tank in the housing and dispensing means for dispensing fuel from the fuel tank upon receipt of payment information from a customer. A telemetry-based communications system may also be included to provide wireless transmission of information, including the payment and approval information, back and forth between each module and the operations control center. The telemetry-based communications system preferably comprises transceiving means including antenna- and/or satellite-based transceivers.

The modules may include motion detection means. The motion detection means generates a motion-detect signal upon detection of motion external to the module housing, which can indicate the arrival of a customer. Electrical supply means such as a diesel generator and/or battery may also be provided for supplying electrical energy to the dispensing means in response to the motion-detect signal, the payment information, the approval information or manual actuation of a turn-on switch. The electrical supply means preferably enables each module to function without being connected to commercial power lines from a utility.

Upon entry of the payment information, the customer can access the dispensing means and begin filling his vehicle or aircraft with an appropriate fuel from the fuel tank. Preferably prior to enabling dispensing of fuel, the telemetry-based communications system is used to provide wireless communication of the payment information to the operations control center and then receive the approval information therefrom which can indicate a success or failure of the payment information to meet a predetermined condition such as creditworthiness, an open account, etc. In the event of a failure, the dispensing means is disabled to prevent dispensing of fuel to the customer. The payment information can be derived from credit or debit cards and cash or checks using conventional equipment. Alternatively, the customer can access an external telephone (e.g., radio or cellular) to communicate directly with the operations control center to obtain authorization to dispense fuel. Preferably, the transceiving means is operatively connected to the external telephone to thereby provide two-way wireless communication with the operations control center. This also provides a safety measure in the event the customer or a passerby needs immediate assistance.

Temperature controlling means including a heating, ventilation and air conditioning unit (HVAC) may also be provided in the housing for controlling temperature in the housing. Preferably, the temperature controlling means comprises a thermostat having means for sensing temperature in a compartment containing the fuel tank and generating a temperature-level signal when the sensed temperature in the fuel tank compartment is outside a predetermined range. The electrical supply means is preferably configured to supply electrical energy to the temperature controlling means in response to the temperature-level signal. The temperature controlling means may also include temperature sensors on the fuel lines connecting the fuel tank with the dispensing means and means for heating these lines to prevent breakage and leakage of fuel when the module is subject to cold climates. The fuel dispensing module can also include computer-controlled weather monitoring hardware for measuring temperature, wind direction and speed, humidity, precipitation and type, etc. and relaying this information to the operations control center in response to a request therefrom or automatically on a periodic basis.

Primary and secondary lighting means are preferably provided for lighting an exterior of the housing. Sunlight sensing means may also be provided for sensing sunlight and generating a low-light signal when an intensity of the sunlight is below a predetermined intensity. Preferably, the secondary lighting means is responsive to the low-light signal and the primary lighting means is responsive to the occurrence of both the low-light signal and the motion-detect signal. Thus, the secondary lighting means is designed to turn on in the evening at dusk and remain on until the next morning so that the module can be seen from a distance at night. The primary lighting means, however, provides additional lighting upon generation of the motion-detect signal. This indicates that a customer or passerby is near or approaching the housing to obtain fuel, air for tires or water, call for assistance, use a wireless pay telephone, etc. A light timer may be provided to shut off the primary lighting means unless another motion-detect signal is generated within a predetermined light-time interval, thus indicating that a customer is still on the premises. Alternatively, the primary lighting can be enabled upon entry of payment information by the customer or upon receipt of the approval information by the transceiving means, or manual actuation of the turn-on switch. Similarly, a generator timer is provided to shut off the generator unless another motion-detect signal is generated within a predetermined generator-time interval. Alternatively, the primary lighting can be enabled upon entry of payment information by the customer or upon receipt of the approval information by the transceiving means, or manual actuation of the turn-on switch Each fuel dispensing module also preferably includes fuel quantity determining means for determining a quantity of stored fuel in each of the sections of the fuel tank and then generating fuel information such as fuel type and levels based on the determined quantity of stored fuel. The stored fuel quantity determining means preferably includes a fuel level sensor in each of the sections of the fuel tank. The telemetry-based wireless communications system can also be accessed to relay the fuel information from each module to the operations control center in response to a request therefrom, periodically at the end of each day, after each sale, or when the quantity of stored fuel falls below a predetermined safe operating level.

A fuel leak detection/reconciliation system can be provided with each module. Preferably, the leak detection and reconciliation system include means, operatively connected to the dispensing means, for determining the fuel type and quantity of fuel dispensed from the dispensing means periodically at predetermined intervals or on a per sale basis. This information is then regularly compared and correlated with the information generated by the stored fuel quantity determining means to determine the occurrence of a fuel leak, theft of fuel, etc.

Methods according to the present invention include the steps of generating the necessary electrical energy to power a remotely located and unattended fuel dispensing module, from fuel stored at the module and transmitting the payment information entered by a customer, from the module to the operations control center by the transceiving means. Then, the payment information is processed and approval information therefrom is generated which indicates a success or failure of the payment information to meet a predetermined condition of creditworthiness, open account, etc. The approval information is then transmitted back to the module to enable the dispensing of fuel from the dispensing means, using the electrical energy generated on-site. Periodically or in response to a request from the operations center, the steps of generating information relating to an amount of fuel stored in the module and an amount of fuel dispensed from the module are performed and this information is then transmitted to the operations control center to cause the delivery of additional fuel, indicate the occurrence of a fuel leak or theft of fuel in the event of a discrepancy.

Accordingly, the present invention provides a system and method for dispensing fuel at remote locations in a cost effective, safe and environmentally responsible manner and without the need of an on-site attendant or connections to commercial power and telephone lines. The present invention also provides a system which can be easily installed and is readily transportable to other remote locations.

DESCRIPTION OF THE DRAWINGS

Other features of the invention will be apparent from the following description of an illustrative embodiment thereof, which should be read in conjunction with the accompanying drawings, in which.

DESCRIPTION OF THE PREFERRED EMBODIMENT

The present invention will now be described more fully hereinafter with reference to the accompanying drawings, in which a preferred embodiment of the invention is shown. The invention may, however, be embodied in different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
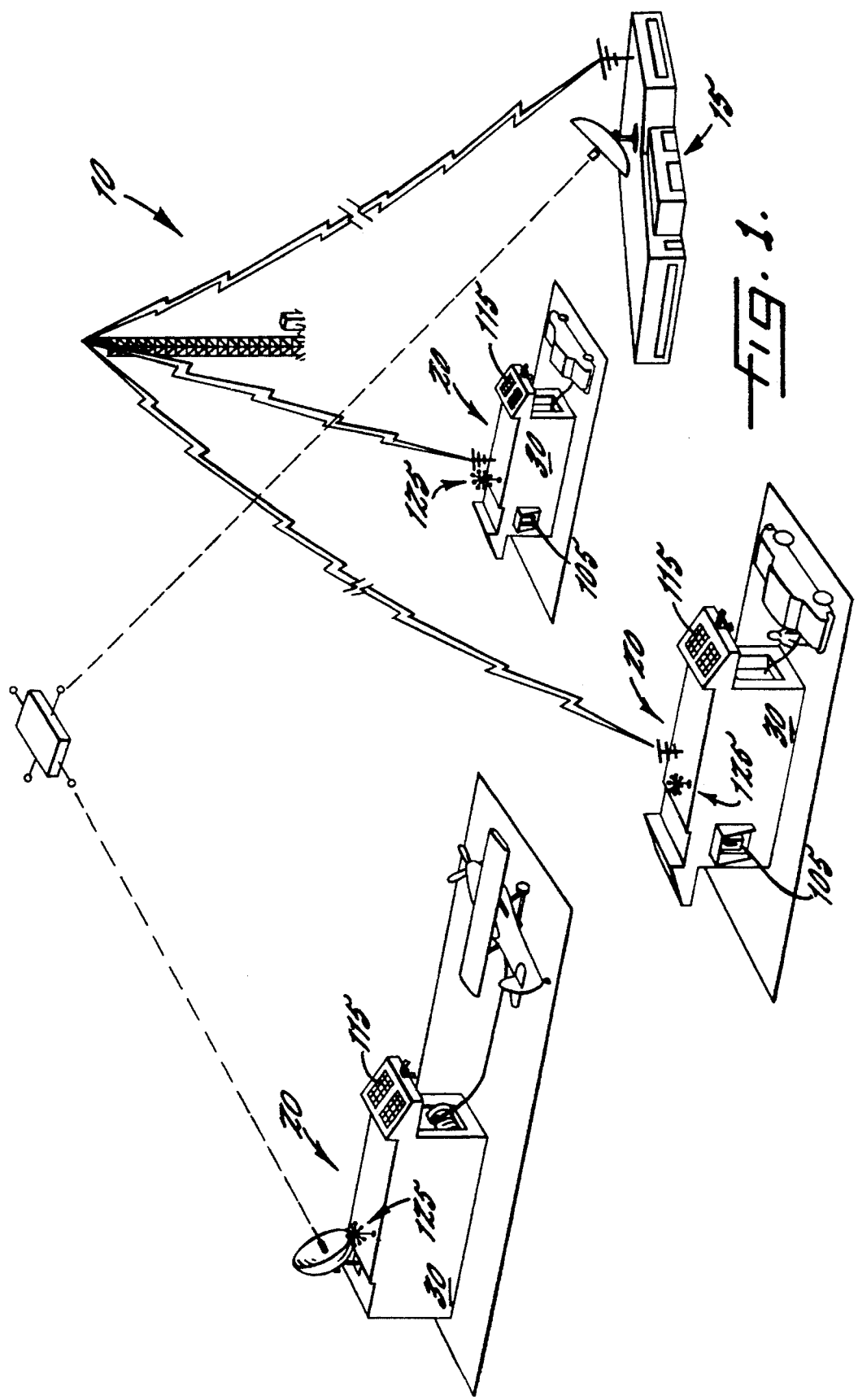
FIG. 1 is a perspective view of a system for dispensing fuel, according to the present invention.
Figure 2:
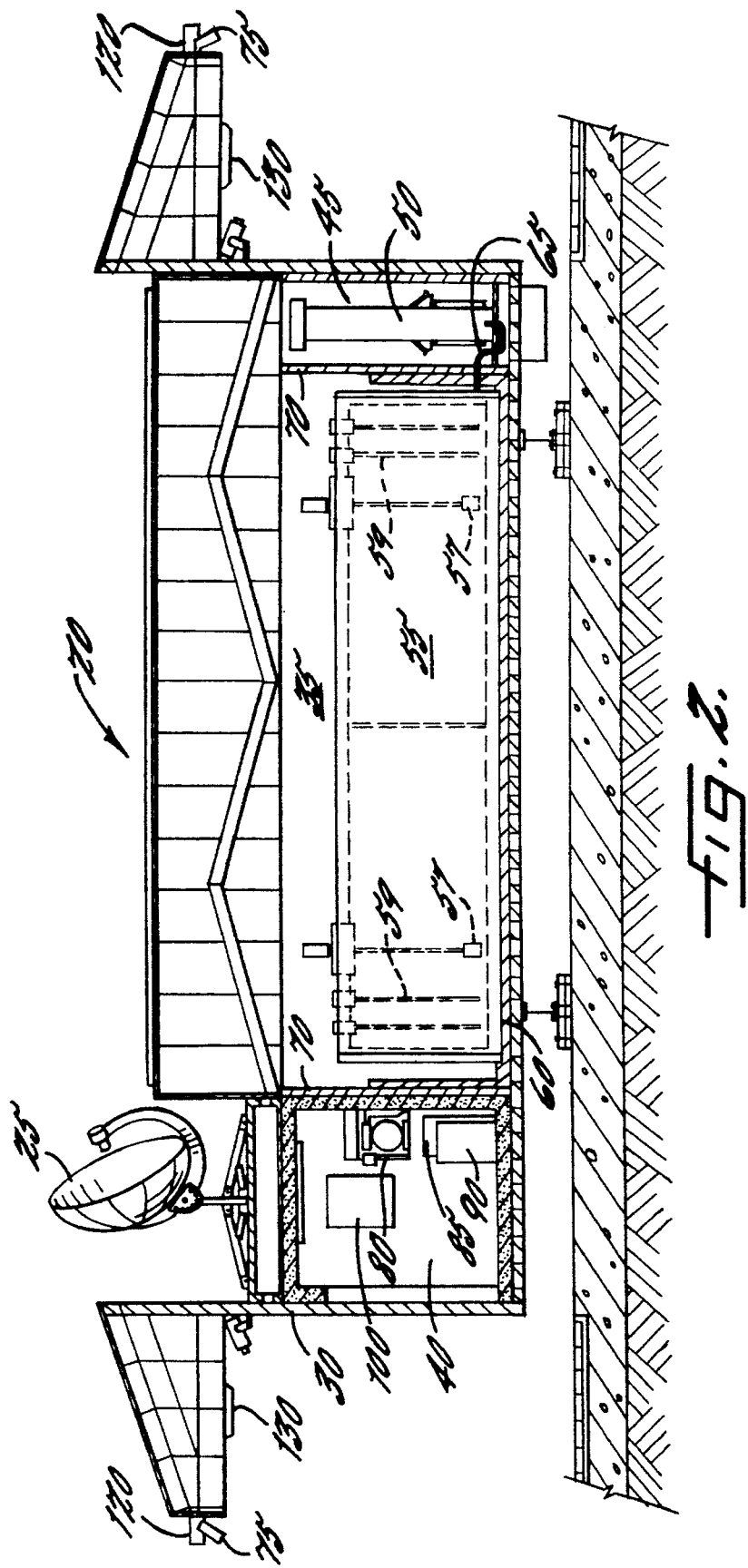
FIG. 2 is a sectional view of a fuel dispensing module, according to the present invention.
Figure 3:
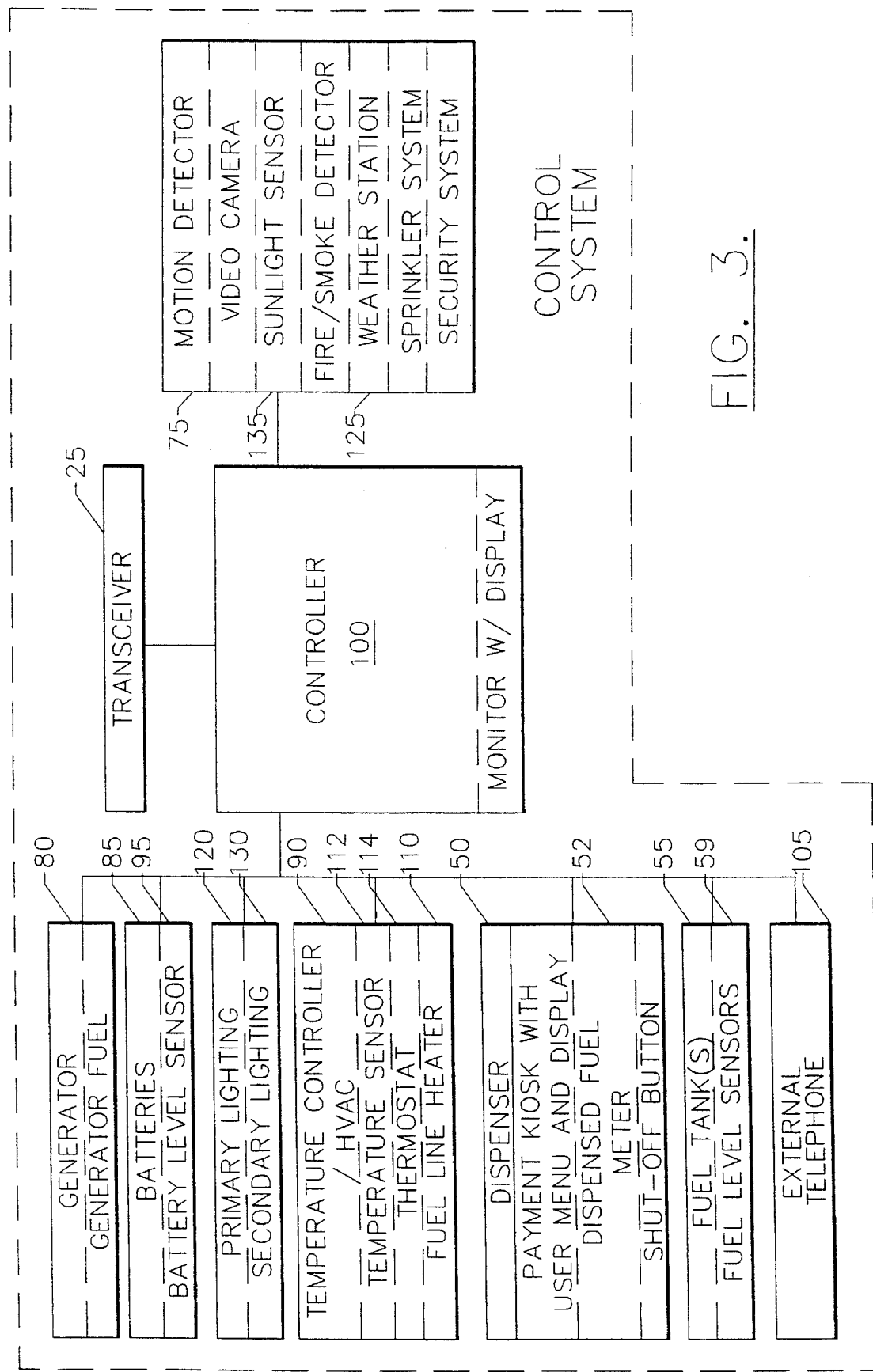
FIG. 3 is a block schematic diagram of a control system for a fuel dispensing module, according to the present invention.

Referring now to FIGS. 1–3, a system 10 for dispensing fuel at a plurality of remote locations according to the present invention will be described. The system 10 includes an operations control center 15 with personnel and computer hardware therein for monitoring and controlling operations at a plurality of fuel dispensing modules 20 which are in wireless communication with the control center 15. The operations control center 15 authorizes the dispensing and delivery of fuel and the dispatch of repair and other maintenance services to the modules 20. These modules 20 may be located close to urban centers and in locations which are hundreds of miles from the control center 15, such as unpopulated and wilderness locations which may be subject to severe adverse weather conditions. As described more fully hereinbelow, the modules 20 can operate independently of each other and 24-hours a day without the necessity of an on-site attendant and preferably without connection to commercial power and telephone lines. The modules 20 can also operate for weeks or months at a time without being refueled or serviced.

In particular, the operations control center 15 includes hardware therein for processing information received from the unattended fuel dispensing modules 20 and transmitting information thereto using a telemetry-based communications system, as illustrated best by FIG. 1. The telemetry-based communications system preferably comprises transceiving means including antenna- and/or satellite-based transceivers 25, at the modules 20 and at the operations center 15. The information transmitted back and forth between the operations control center 15 and the modules 20 is preferably encrypted and can include commands, diagnostic and measurement requests, and approval information to authorize the dispensing of fuel upon receipt of payment information from the modules 20. A suitable telemetry-based communications system can be assembled by one of ordinary skill in the art, from components which are publicly available from Meteor Communications Corporation of Kent, Wash., for example.

As illustrated best by FIG. 2, each fuel module 20 includes a multi-compartment housing 30. The housing 30 may be of prefabricated construction suitable for transportation in its entirety to a remote site or as prefabricated segments which can be readily assembled at the remote site. The housing 30 is preferably constructed and reinforced with materials that are capable of sustaining potentially severe adverse weather conditions for extended durations. The housing 30 can be constructed so as to be capable of containing (or having mounted thereto) all the system components which reside at the site. Thus, the housing 30 preferably contains, among other things, a fuel storage compartment or tank room 35, a mechanical or utility room 40 and a dispenser room 45. The dispenser room 45 contains and shelters fuel dispensing means including a multi-product fuel dispenser 50 from the elements, but allows ready access to the fuel dispenser 50 by a customer seeking to dispense fuel to a vehicle. On the other hand, the fuel storage compartment 35 and utility room 40 are designed to be unaccessible by a customer and include a security system to prevent vandalism, fuel theft and tampering. Fire resistant partitions 70 are also preferably provided to insulate the utility room 40 and dispenser room 45 from the fuel storage compartment 35 in the event of fire. A fire detection and sprinkler system (not shown) may also be provided. The dispenser room 45 may contain an emergency shut-off button to stop the dispensing of fuel. A vending machine and compressed air and water tanks and hoses (all not shown) may also be provided in the dispenser room 45 for customer use.

Multi-product fuel dispensers 50 are publicly available from companies such as Glibarco Inc., of Greensboro, N.C. These dispensers 50 preferably include or are upfitted with an extended function payment kiosk with menu-driven display. The kiosk is preferably designed to accept credit cards, debit cards, cash, checks and customer identification information and issue receipts, change and generate payment information therefrom.

The fuel storage compartment 35 includes an Underwriters Laboratory approved multi-section two-hour fuel storage tank 55 (UL #2085) of sufficient capacity to meet the expected fuel demands of the remote site. Suitable tanks 55 having capacities in the range of 4000–6000 gallons may be purchased from Fireguard Corporation of Miami, Fla. Submerged pumps 57 may also be purchased from Red Jacket Corporation. The interior of the fuel storage compartment 35 is preferably lined with a fuel impervious containment basin or barrier coating 60 to prevent the escape of fuel from the fuel storage compartment 35 in the event of a fuel leak therein. Suitable protective coatings are publicly available from Sherwin Williams Corporation, under the tradename SHELCOTE™. Flexible double-walled insulated piping 65 may be used to connect the fuel tanks 55 to the fuel dispenser 50 and prevent leakage of fuel to the environment.

Motion detectors 75 are also mounted on the exterior of the housing 30. The motion detectors 75 may be of conventional design and generate a "motion-detect" signal upon detection of motion external to the housing 30, which can indicate the arrival of a customer. The motion-detect signal can then be used to turn on generator power, lighting, security cameras, etc., as described more fully hereinbelow, to facilitate 24-hour a day availability without need for an on-site attendant. The motion detectors are preferably positioned and adjusted to prevent the occurrence of erroneous motion-detect signals caused by stray disturbances such as weather, animals, etc.

Electrical supply means, including an electrical generator 80 with respective fuel supply (not shown) and a bank of maintenance free rechargeable batteries 85, is preferably provided for powering the module 20. The electrical supply means preferably enables each module 20 to function as a self-contained and independent unit, without being connected to commercial power lines. To supplement battery power, the electrical supply means may also include a solar panel 115 mounted to the exterior of the housing, as illustrated, or a windmill (not shown).

The electrical supply means provides electrical energy to the housing's control system, which is illustrated schematically in block diagram at FIG. 3. In particular, the batteries 85 provide relatively low levels of sustaining energy to the control system on a continuous basis and are recharged by the generator 80 using a battery charger (not shown), when a battery level sensor 95 indicates a low-charge condition. The generator 80 is controlled to turn-on for relatively short durations and provide high levels of energy to those components of the control system which have high electrical current demands. An AC/DC converter (not shown) can be provided so that both AC and DC energy can be supplied by the generator 80.

The housing's control system illustrated in FIG. 3 includes a microprocessor-based controller 100 for controlling the operations performed by the module 20 including many of the functions performed by its hardware components. The controller 100 also controls the functions performed by the transceiver 25 in communicating with the operations control center 15. As will be understood by those skilled in the art, the controller 100 preferably comprises a plurality of pluggable hardware cards, general purpose and/or application specific integrated circuits and software for performing the operations described herein. For example, the controller 100 is preferably programmed to turn on the generator 80 upon the occurrence of the motion-detect signal. The generator 80 may also be turned on in response to the entry of the payment information by a customer, manual actuation of a turn-on switch (not shown) by a customer or receipt of the approval information from the control center 15. The controller 100 also includes a monitor with display so that a field technician performing service can run diagnostic tests and perform repairs and reprogram the operations of the control system, if necessary.

As described above, the preferred payment kiosk at the dispenser 50 reads credit and debit cards, accepts cash, checks, PIN verification numbers, etc. and generates information relating to payment amounts, credit account name, number and expiration date, which as broadly defined herein constitute "payment information". Upon entry of this payment information, the customer is instructed to access the dispenser 50 and begin filling his vehicle, boat or aircraft with an appropriate fuel from the fuel tank. However, prior to enabling the dispensing of fuel from the dispenser 50, the controller 100 and transceiver 25 operate to transmit the payment information from the kiosk to the operations control center 15 as encrypted data and then receive the approval information therefrom, which can indicate a success or failure of the payment information to meet a predetermined condition such as creditworthiness, an open account, etc. A module identification number and location code, date and time stamp are also preferably included with the payment information. In the event of a failure, the dispenser 50 is disabled by the controller 100 so as to prevent dispensing of fuel to the customer. Alternatively, the customer can access an external menu-driven telephone 105 to communicate directly with the operations control center 15 to obtain authorization to dispense fuel. The transceiver 25 is operatively connected to the external telephone 105 (via the controller 100) to provide two-way wireless communication with the operations control center 15. The telephone also provides a safety measure in the event the customer or a passerby needs immediate assistance. Upon appropriate menu selection, the telephone 105 can also be used as a conventional pay telephone.

Temperature controlling means including a heating, ventilation and air conditioning unit (HVAC) 90 may also be provided to adjust temperature in the housing 30. The temperature controlling means can be electrically powered by the generator 80 or can be fuel powered. The temperature controlling means preferably comprises a thermostat 110 having means for sensing temperature in the fuel storage compartment 35 and generating a "temperature-level" signal to the HVAC unit 90 and controller 100 when the sensed temperature in the fuel tank compartment 35 is outside a predetermined range. The controller 100 may be programmed to turn on the electrical generator 80 and HVAC unit 90, in response to the temperature-level signal, so that the temperature in the fuel storage compartment can be raised or lowered to within the predetermined range. Temperature sensors 112 and fuel line heaters 114 may also be attached to the fuel lines 65, which connect the fuel tank 55 to the dispenser 50, to prevent cracking and leakage of fuel when the module is subject to extremely cold climates.

Conventional weather monitoring hardware 125 for measuring temperature, wind direction and speed, humidity, precipitation and type, etc. may be provided for generating weather data to the controller 100. This data is then relayed to the operations control center in response to a request therefrom, automatically on a periodic basis or upon the occurrence of a programmed adverse weather alert condition.

Primary lighting 120 and secondary lighting 130 are preferably provided for lighting an exterior of the housing. A sunlight sensor 135 may be provided for sensing sunlight and generating a "low-light" signal when an intensity of the sunlight is below a predetermined intensity. Preferably, the secondary lighting 130 is responsive to the low-light signal and the primary lighting 120 is responsive to the simultaneous occurrence of both the low-light signal and the motion-detect signal. Thus, the secondary lighting 130 is designed to turn on in the evening at dusk and remain on until the next morning so that the module can be seen from a distance at night. Alternatively, the secondary lighting 130 can also include one or more strobe lights. However, the primary lighting 120 is designed to provide additional and more substantial lighting upon generation of the motion-detect signal at night. This indicates that a customer or passerby is near or approaching the housing to obtain fuel, air for tires or water, use the wireless pay telephone or call for assistance, etc. The lighting is preferably configured so that the secondary lighting 130 is battery powered, but the primary lighting is powered by the generator 80 because it requires substantially greater amounts of energy.

The controller 100 also preferably includes a light timer therein to shut off the primary lighting 120 unless another motion-detect signal is generated within a predetermined "light-time" interval to indicate that a customer is still on the premises. Alternatively, the primary lighting 120 can be turned on upon entry of the payment information by the customer or upon receipt of the approval information by the transceiving means, or manual actuation of the turn-on switch (not shown). The controller 100 also preferably includes a generator timer to shut off the generator 80 unless a motion-detect signal is generated within a predetermined "generator-time" interval. The generator-time interval may be of same or greater duration than the light-time interval. The controller 100 may be programmed to reset the light timer and generator timer every time a motion detect signal is generated.

Each fuel dispensing module preferably includes fuel quantity determining means for determining a quantity of stored fuel in each of the sections of the fuel tank 55 and generating fuel information to the control center 15, based on the determined quantity of stored fuel (i.e., fuel inventory). The fuel information can also include information relating to fuel type, temperature and vapor pressure. The stored fuel quantity determining means preferably includes fuel level sensors 59 in each of the sections of the fuel tank 55 so that the quantities of stored fuel can be determined by the controller 100 from the dimensions of the tank 55 which are preferably stored in the controller's internal memory. The controller 100 is programmed to compute this information and then communicate it to the operations control center 15 in response to a fuel-quantity request therefrom, periodically at the end of each day, after each sale, or when the quantity of stored fuel falls below a predetermined safe operating level.

A fuel leak detection/reconciliation system is preferably provided with each module. Preferably, the leak detection and reconciliation system includes a dispensed fuel meter 52, operatively connected to the dispenser 50 and the controller 100, for determining the fuel type and quantity of fuel dispensed from the dispenser 50 at periodic and predetermined intervals or on a per sale basis. This information is then regularly compared and correlated with the information generated by the fuel quantity determining means in the controller 100 to determine the occurrence of a fuel leak, theft of fuel, etc. These and other operations of the controller 100, which determine fuel inventory, perform leak detection and reconciliation, are more fully described in U.S. Pat. Nos. 4,977,528 and 5,297,423 to Norris and Keating et al., respectively, the disclosures of which are hereby incorporated herein by reference. Components for performing these inventory and leak detection/reconciliation functions are publicly available from Emco Electronics of Cary, N.C., under the tradename EECO System™.

While a preferred embodiment of the invention has been specifically shown and described, this was for purposes of illustration only, and not for purposes of limitation, the scope of the invention being in accordance with the following claims.

That which is claimed is:

1. A system for dispensing fuel at remote locations, comprising:

a housing having a plurality of compartments therein;

a fuel tank in one of said compartments;

motion detection means for generating a motion-detect signal upon detection of motion external to said housing;

temperature controlling means for controlling temperature in at least one of said compartments;

fuel quantity determining means, operatively connected to said fuel tank, for determining a quantity of fuel in said fuel tank and generating fuel information based on the determined quantity of fuel;

means responsive to user actuation for receiving payment information relating to fuel to be dispensed from said fuel tank;

transceiving means, responsive to said fuel quantity determining means and said payment information receiving means, for providing wireless transmission of the payment information and the fuel information to an external site and wireless reception of approval information from the external site;

dispensing means, responsive to said payment information receiving means, for dispensing fuel from said fuel tank; and electrical energy generating means, operatively connected to said dispensing means, for generating electrical energy in response to at least one of the motion-detect signal, the payment information and the approval information.

2. The system for dispensing fuel according to claim 1, wherein said temperature controlling means comprises means for sensing temperature in said at least one of said compartments; and wherein said electrical energy generating means comprises means, operatively connected to said temperature controlling means, for generating electrical energy when the sensed temperature in said at least one of said compartments is outside a predetermined temperature range.

3. The system for dispensing fuel according to claim 1, further comprising:

sunlight sensing means external to said housing for sensing sunlight; and lighting means, responsive to said sunlight sensing means, for lighting an exterior of said housing when an intensity of the sensed sunlight is below a predetermined intensity.

4. The system for dispensing fuel according to claim 3, further comprising additional lighting means, responsive to said sunlight sensing means and said motion detection means, for lighting an exterior of said housing in response to the motion-detect signal and when an intensity of the sensed sunlight is below a predetermined intensity.

5. The system for dispensing fuel according to claim 1, further comprising:

sunlight sensing means external to said housing for sensing sunlight; and primary lighting means, responsive to said sunlight sensing means and said motion detection means, for lighting an exterior of said housing in response to the motion-detect signal and when an intensity of the sensed sunlight is below a predetermined intensity.

6. The system for dispensing fuel according to claim 5, further comprising a light timer, responsive to said motion detection means, for turning off said primary lighting means after a predetermined light-time interval has expired subsequent to generation of the motion-detect signal; and means, responsive to said motion detection means, for resetting said light timer if said motion detection means detects motion external to said housing during the light-time interval.

7. The system for dispensing fuel according to claim 4, further comprising:

at least one battery in said housing, operatively connected to said transceiving means and said secondary lighting means; and wherein said electrical energy generating means comprises means, operatively connected to said primary lighting means, for generating electrical energy in response to the motion detect signal.

8. The system for dispensing fuel according to claim 1, further comprising a generator timer, responsive to said motion detection means, for turning off said electrical energy generating means after a predetermined generator-time interval has expired subsequent to generation of the motion-detect signal; and means, responsive to said motion detection means, for resetting said generator timer if said motion detection means detects motion external to said housing during the generator-time interval.

9. The system for dispensing fuel according to claim 1, further comprising:

at least one battery in said housing, electrically connected to said transceiving means; and battery level sensing means, operatively connected to said at least one battery, for sensing a charge level of said at least one battery; and wherein said electrical energy generating means comprises means, operatively connected to said at least one battery, for generating electrical energy for said at least one battery when the sensed charge level is below a predetermined level.

10. A system for dispensing fuel at remote locations, comprising:

an unattended fuel dispensing module at a remote location; and an operations control center comprising means for processing payment information received from said unattended fuel dispensing module and authorizing dispensing of fuel in response to the payment information by providing wireless transmission of approval information to said fuel dispensing module; and wherein said unattended fuel dispensing module comprises:
a housing;
a fuel tank in said housing;
motion detection means for generating a motion-detect signal upon detection of motion external to said housing;
means accessible from external to said housing for receiving the payment information;
transceiving means, proximate said housing, for providing wireless transmission of the payment information to said operations center and wireless reception of the approval information from said operations center;
dispensing means accessible from external to said housing for dispensing fuel from said fuel tank in response to at least one of the payment information and the approval information;
at least one battery in said housing, electrically connected to said transceiving means;
primary lighting means, responsive to said motion detection means, for lighting an exterior of said housing; and
means in said housing for providing a source of electrical energy to said dispensing means and said primary lighting means in response to at least one of the motion-detect signal, the payment information and the approval information.

11. The system for dispensing fuel according to claim 10, further comprising:
temperature controlling means for controlling temperature in said housing;
means for sensing temperature in said housing; and
wherein said means for providing a source of electrical energy comprises electrical energy generating means, operatively connected to said temperature controlling means, for generating electrical energy when the sensed temperature in said housing is outside a predetermined temperature range.

12. The system for dispensing fuel according to claim 11, further comprising sunlight sensing means external to said housing for sensing sunlight; and wherein said primary lighting means is responsive to said sunlight sensing means.

13. The system for dispensing fuel according to claim 12, wherein said electrical energy generating means comprises means, operatively connected to said primary lighting means, for generating electrical energy in response to the motion-detect signal and when an intensity of the sensed sunlight is below a predetermined intensity.

14. The system for dispensing fuel according to claim 12, further comprising a light timer, responsive to said motion detection means, for turning off said primary lighting means after a predetermined light-time interval has expired subsequent to generation of said motion-detect signal; and means, operatively connected to said motion detection means, for resetting said light timer if said motion detection means detects motion external to said housing during said light-time interval.

15. A system for dispensing fuel at remote locations, comprising:
a plurality of unattended fuel dispensing modules at respective remote locations; and an operations control center comprising means for processing payment information received from said plurality of unattended fuel dispensing modules and authorizing dispensing of fuel in response to the payment information by providing wireless transmission of approval information to said fuel dispensing modules; and wherein said plurality of unattended fuel dispensing modules include:
a first fuel dispensing module at a first remote location, said first fuel dispensing module being disconnected from commercial power lines and having a housing; a fuel tank in said housing; transceiving means, proximate said housing, for providing wireless transmission of the payment information to said operations control center and wireless reception of the approval information from said operations control center; dispensing means accessible from external to said housing for dispensing fuel from said fuel tank upon receipt of at least one of the payment information and the approval information; and a fuel-powered electrical energy generator and at least one battery proximate said housing for providing electrical energy to said first fuel dispensing module; and
a second fuel dispensing module at a second remote location, different from the first remote location, said second fuel dispensing module having a housing; a fuel tank in said housing; transceiving means, proximate said housing, for providing wireless transmission of the payment information to said operations control center and wireless reception of the approval information from said operations control center; and dispensing means accessible from external to said housing for dispensing fuel from said fuel tank upon receipt of at least one of the payment information and the approval information; and wherein said operations control center further comprises means for providing wireless transmission of a fuel-quantity request to said first and second fuel dispensing modules;

wherein said first and second fuel dispensing modules have respective fuel quantity determining means therein for determining a quantity of fuel in their respective fuel tanks and generating fuel information based on the determined quantity; and wherein said transceiving means of said first and second fuel dispensing modules further comprise means for providing wireless transmission of said fuel information to said operations control center, in response to the fuel-quantity request, so that said operations control center can initiate dispatch of fuel to said fuel modules when the fuel information indicates a shortage of fuel.

16. The system for dispensing fuel according to claim 15, wherein said dispensing means of said first and second modules are respectively disabled in the event the respective approval information indicates a failure of the respective payment information to meet a predetermined condition.

17. The system for dispensing fuel according to claim 15, wherein said first fuel dispensing module further comprises a fuel line connecting said fuel tank with said dispensing means and means, contacting said fuel line, for heating said fuel line to prevent breakage thereof when subject to cold temperatures.

18. The system for dispensing fuel according to claim 15, wherein said first fuel dispensing module further comprises motion detection means for detecting motion external to said housing; and primary lighting means, responsive to at least one of said motion detection means, the respective payment information and the respective approval information, for lighting an exterior of said housing.

19. The system for dispensing fuel according to claim 15, wherein said first fuel dispensing module comprises a fuel compartment containing said fuel tank; and wherein said fuel compartment contains a fuel impervious containment liner to prevent leakage of spilt fuel in said fuel compartment to areas of said housing outside said fuel compartment.

20. A system for dispensing fuel at remote locations, comprising:

a housing containing a fuel storage compartment therein;

motion detection means for generating a motion-detect signal upon detection of motion external to said housing;

fuel quantity determining means, operatively connected to said fuel tank, for determining a quantity of fuel in said fuel tank and generating fuel information based on the determined quantity of fuel;

means responsive to user actuation for receiving payment information relating to an amount of fuel to be dispensed from said fuel tank;

temperature controlling means for controlling temperature in said housing;

dispensing means, responsive to said payment information receiving means, for dispensing fuel from said fuel tank;

transceiving means, responsive to said fuel quantity determining means and said payment information receiving means, for providing wireless transmission of the payment information and the fuel information to an external site and wireless reception of approval information from the external site;

at least one battery operatively connected to said transceiving means;

primary lighting means, responsive to said motion detection means, for lighting an exterior of said housing in response to the motion-detect signal;

a light timer, operatively connected to said motion detection means, for turning off said primary lighting means after a predetermined light-time interval has expired subsequent to generation of said motion-detect signal; and means, operatively connected to said motion detection means and said light timer, for resetting said light timer if said motion detection means detects motion external to said housing during said light-time interval.

21. The system for dispensing fuel according to claim 20, further comprising a fuel impervious containment layer lining said fuel storage compartment.

22. The system for dispensing fuel according to claim 20, further comprising electrical energy generating means, operatively connected to said dispensing means, for generating electrical energy in response to at least one of the motion-detect signal, the payment information and the approval information.

23. The system for dispensing fuel according to claim 20, further comprising electrical energy generating means, operatively connected to said dispensing means and said primary lighting means, for generating electrical energy in response to at least one of the motion-detect signal, the payment information and the approval information.

24. The system for dispensing fuel according to claim 23, further comprising:

a generator timer, operatively connected to said motion detection means, for turning off said electrical energy generating means after a predetermined generator-time interval has expired subsequent to generation of said motion-detect signal; and means, responsive to said motion detection means and said generator timer, for resetting said generator timer if said motion detection means detects motion external to said housing during said generator-time interval.

25. The system for dispensing fuel according to claim 20, further comprising:

sunlight sensing means, proximate said housing, for sensing sunlight and generating a low-light signal when an intensity of the sunlight is below a predetermined intensity; and secondary lighting means, responsive to the low-light signal, for lighting an exterior of said housing.

26. A fuel dispensing module for dispensing fuel at a remote location, comprising:

a housing having a plurality of compartments therein;

a fuel tank in one of said compartments;

fuel quantity determining means, operatively connected to said fuel tank, for determining a quantity of fuel stored in said fuel tank;

dispensing means in said housing and accessible from external to said housing for dispensing fuel from said fuel tank;

means, operatively connected to said dispensing means, for determining a quantity of fuel dispensed from said dispensing means;

means, operatively connected to said stored fuel quantity determining means and said dispensed fuel quantity determining means, for determining the occurrence of a fuel leak in at least one of said plurality of compartments;

means responsive to user actuation for receiving payment information relating to an amount of fuel to be dispensed from said fuel tank;

transceiving means, responsive to said dispensing means, said stored fuel quantity determining means and said dispensed fuel quantity determining means, for providing wireless transmission of information relating to the determined stored fuel quantity, information relating to the determined dispensed fuel quantity, information relating to the determined occurrence of a fuel leak and the payment information to an external site;

means, operatively connected to said dispensing means, said stored fuel quantity determining means, said dispensed fuel quantity determining means and said transceiving means, for supplying electrical energy thereto.

27. The fuel dispensing module according to claim 26, wherein said electrical energy supplying means comprises a fuel-powered generator and at least one battery.

28. The fuel dispensing module according to claim 27, wherein said fuel tank comprises a plurality of sections containing respective fuels and wherein said fuel quantity determining means comprises a fuel level sensor in at least one of said plurality of sections.

29. The fuel dispensing module according to claim 26, further comprising weather monitoring means, proximate said housing, for monitoring weather conditions and generating weather information therefrom; and wherein said transceiving means comprises means for providing wireless transmission of said weather information to the external site.

30. In a system for dispensing fuel having an operations control center for processing information relating to dispensing of fuel and a plurality of remotely located and unattended fuel dispensing modules which are disconnected from commercial power lines, but are self-powered and communicatively networked to the control center by respective transceivers, a method of dispensing fuel comprising the steps of:

generating electrical energy to power a module in the plurality of remotely located and unattended fuel dispensing modules, from fuel stored at the module;

transmitting payment information relating to an amount of fuel to be dispensed at the module, from the module to the operations control center by a respective transceiver;

processing the payment information and generating approval information therefrom which indicates a success of the payment information to meet a predetermined condition;

transmitting the approval information from the operations control center to thereby enable the dispensing of fuel from a dispenser at the module;

dispensing fuel from the dispenser upon reception of the approval information by the transceiver, using the electrical energy;

generating information relating to an amount of fuel stored in the module and transmitting the information relating to the amount of fuel stored, from the module to the operations control center, by the transceiver; and generating information relating to an amount of fuel dispensed from the module and transmitting the information relating to the amount of fuel dispensed, from the module to the operations control center, by the transceiver.

31. The method of dispensing fuel according to claim 30, wherein said electrical energy generating step is preceded by the step of generating a motion-detect signal in response to movement of a user external to the module.

32. The method of dispensing fuel according to claim 31, further comprising the step of lighting an exterior of the module in response to the motion-detect signal.

33. The method of dispensing fuel according to claim 30, further comprising the steps of sensing sunlight exterior of the module and lighting an exterior of the module when an intensity of the sensed sunlight is below a predetermined minimum, using the electrical energy.

34. The method of dispensing fuel according to claim 30, further comprising the steps of sensing a temperature internal to the module and heating the module when the sensed temperature is below a predetermined temperature, using the electrical energy.

35. The method of dispensing fuel according to claim 30, further comprising the steps of monitoring weather conditions external to the module and transmitting the weather conditions from the module to the operations control center by the transceiver.

* * * * *